ically visible on the page.

UNITED STATES PATENT OFFICE.

TRAUGOTT SANDMEYER, OF BASLE, SWITZERLAND, ASSIGNOR TO JOHN R. GEIGY & CO., OF SAME PLACE.

RED DYE.

SPECIFICATION forming part of Letters Patent No. 573,299, dated December 15, 1896.

Application filed September 21, 1896. Serial No. 606,579. (Specimens.)

*To all whom it may concern:*

Be it known that I, TRAUGOTT SANDMEYER, a citizen of the Swiss Confederation, residing at Basle, Switzerland, have invented certain new and useful Improvements in the Production of Red Coloring-Matter, of which the following is a specification.

This invention relates to the production of a new coloring-matter which belongs to the class of so-called "rhodamine colors" and which is of a very pure red shade and which dyes wool from an acidulated bath, giving shades which are characterized by a remarkable fastness against the action of alkalies. I have found that the orthosulfo-acid of benzaldehyde can be very easily condensed with alkylated metaämidophenol to dihydroxylated alkyldiamidotriphenylmethanmonosulfo-acids, which do not furnish coloring-matters by oxidation, but only after a previous intramolecular removal of one molecule of water on treating the same with one of the usual water-removing agents.

As an example of the manner in which this red coloring-matter may be prepared I proceed as follows: Thirty-seven kilograms of a solution containing ten per cent. of benzaldehyde-orthosulfo-acid are boiled with seven kilograms of diethylmetaämidophenol for eight hours. The solution of the thus-obtained tetraethyldiamidodioxytriphenylmethanmonosulfo-acid is then evaporated to dryness, the remainder being powdered and heated with forty kilograms of concentrated sulfuric acid for one hour to 135° to 140° centigrade. I dilute with four hundred liters of water, boil and filter the cold solution, to which are now added eighteen kilograms of a solution of ferric chlorid containing thirty-three per cent. $Fe_2Cl_6$. I heat up for four to five hours to 80° to 90° centigrade, after which the coloring-matter thus formed separates partly in crystals and remains partly in solution and can be precipitated by addition of common salt. It is filtered from the acid solution, washed with a hot concentrated solution of common salt in order to remove the adhering ferric salts, and finally boiled with aqueous ammonia. By this treatment the coloring-matter is separated from the other red coloring-matters of the same shade, but soluble in alkalies. The pure product is filtered, washed with water, dried, and crystallized from its alcoholic or acetic-acid solution. It is obtained as a greenish crystalline powder, which dissolves sparingly in cold water, somewhat better in hot water, and very easily in alcohol and acetic acid with a bluish-red shade. All these solutions, especially the alcoholic one, show a very bright yellowish-red fluorescence. An addition of ammonia or soda-lye to the aqueous solution does not change the color.

In hydrochloric acid and diluted sulfuric acid the coloring-matter is very easily soluble with a yellowish-red shade, turning to bluish-red by addition of water. From these solutions wool and silk are dyed in very pure bluish-red shades which are perfectly fast to alkalies.

When, in the above example, instead of diethylmetaämidophenol is substituted dimethylmetaämidophenol, a very similar coloring-matter is obtained, which differs only from the first one by its being less soluble and dissociating very easily from its solution in mineral acids. The described process can be altered in this way, that the condensation of the benzaldehydeorthosulfo-acid with the alkylated amidophenol and the removal of one molecule of water in the first-formed product of condensation are accomplished at the same time. For this purpose the calculated quantities of the above-mentioned dry substances are dissolved in concentrated sulfuric acid, then heated to 100° centigrade for a few hours and finally to 130° to 140° centigrade. The further working up is the same as described in the previous example.

The new red dyestuff has probably the following formula:

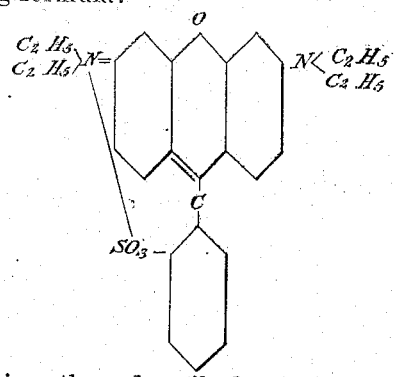

Having thus described my invention, I claim as new and desire to secure by Letters Patent—

1. The process herein described of producing a red coloring dyestuff, which consists in condensing benzaldehydeorthosulfo-acid with an alkylated metaämidophenol, removing one molecule of water from the thus-obtained dihydroxylated tetraethyldiamidotriphenylmethanmonosulfo-acid, and oxidizing the thus-formed derivatives of triphenylmethan oxid, substantially as set forth.

2. The process herein described of producing a red coloring dyestuff, which consists in condensing benzaldehydeorthosulfo-acid with an alkylated metaämidophenol, such as diethylmetaämidophenol, removing one molecule of water from the thus-obtained dihydroxylated tetraethyldiamidotriphenylmethanmonosulfo-acid by treating the same by one of the usual water-removing agents, such as concentrated sulfuric acid, and oxidizing the thus-formed derivative of triphenylmethan oxid, substantially as set forth.

3. The new coloring-matter herein described, being a greenish crystalline powder, scarcely soluble in cold water, somewhat better soluble in hot water, very easily soluble in alcohol and acetic acid with a bluish-red shade showing a very bright yellowish-red fluorescence, soluble in hydrochloric acid and diluted sulfuric acid with a yellowish-red shade turning to bluish red by addition of water, producing on silk and wool very pure red shades distinguished by their fastness against the action of alkalies, substantially as described.

In testimony that I claim the foregoing as my invention I have signed my name in presence of two subscribing witnesses.

TRAUGOTT SANDMEYER.

Witnesses:
GEORGE GIFFORDS,
ALBERT GRAETER.